March 13, 1945.  W. C. CHENEY ET AL  2,371,504
PROJECTOR APPARATUS
Filed Sept. 15, 1941  2 Sheets-Sheet 1
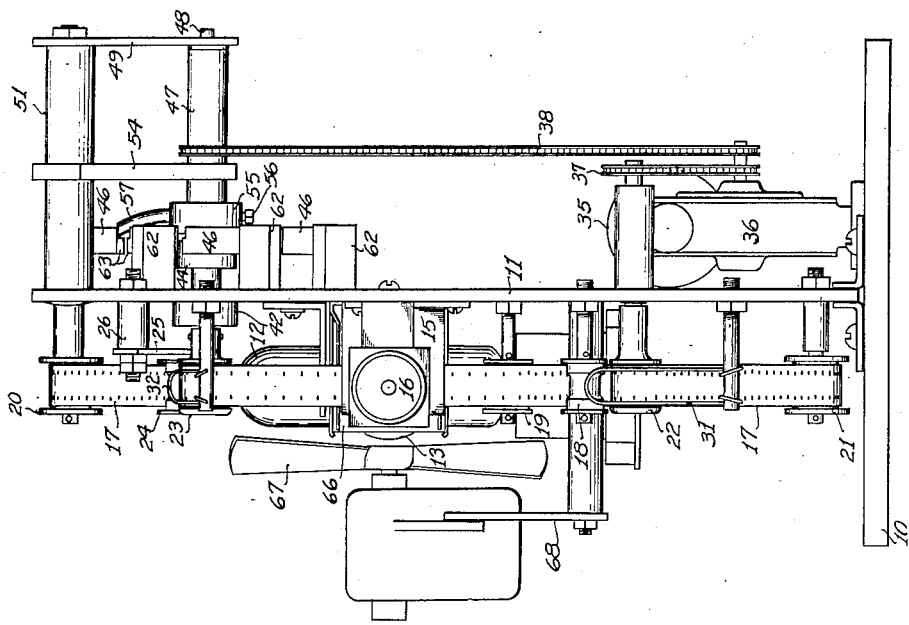
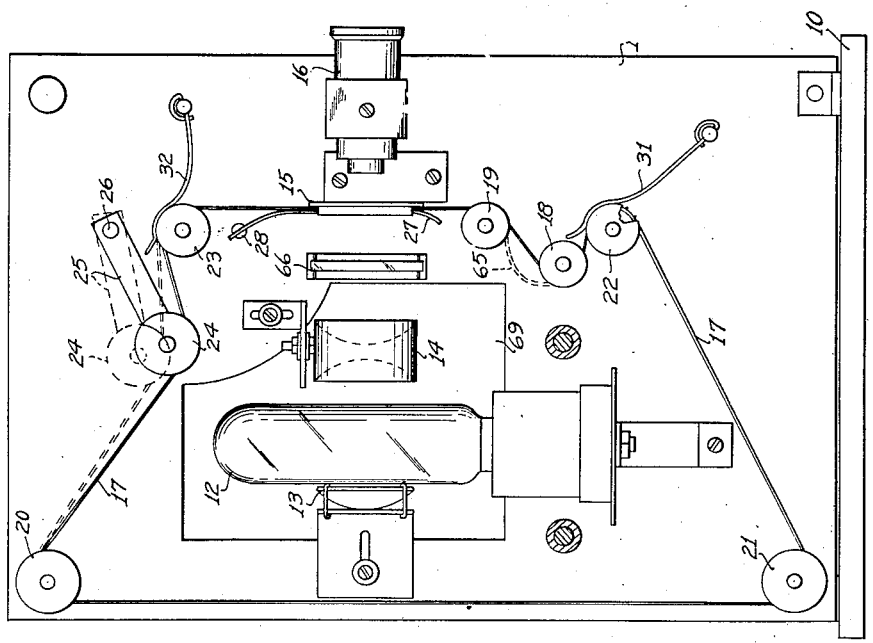
WILLIAM C. CHENEY
ROBERT S. WERTHEIMER
INVENTORS
BY 
ATTORNEY March 13, 1945. W. C. CHENEY ET AL 2,371,504
PROJECTOR APPARATUS
Filed Sept. 15, 1941 2 Sheets—Sheet 2
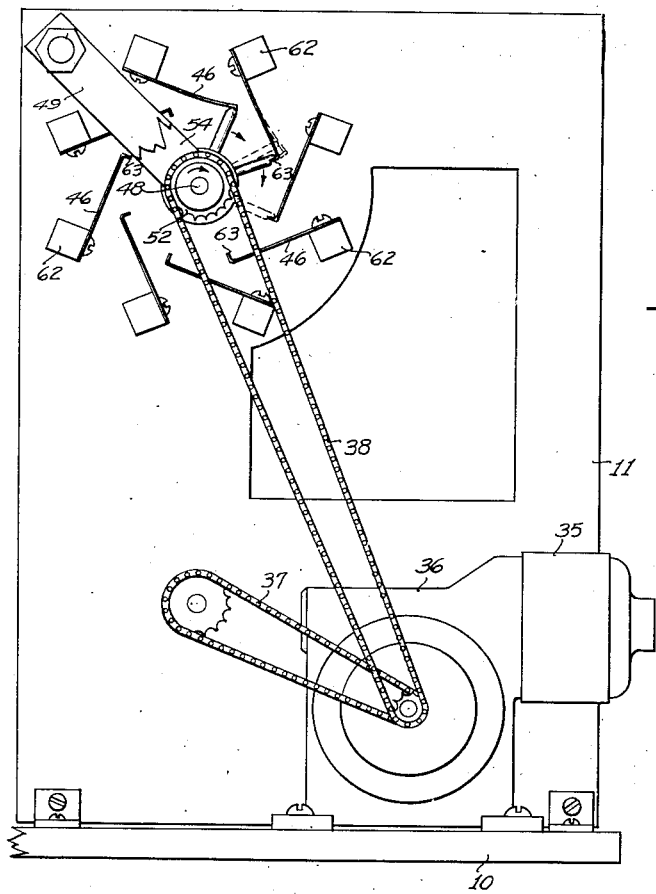
Fig. 3
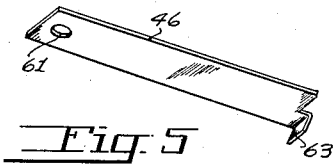
Fig. 5
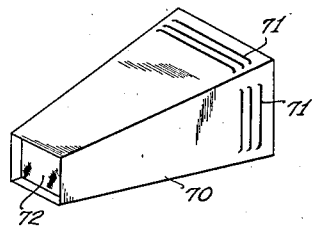
Fig. 6
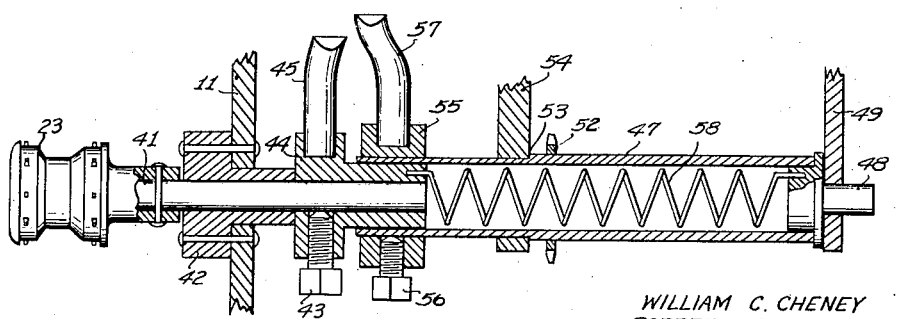
Fig. 4
WILLIAM C. CHENEY
ROBERT S. WERTHEIMER
INVENTORS
BY
ATTORNEY Patented Mar. 13, 1945

2,371,504

UNITED STATES PATENT OFFICE 2,371,504

PROJECTOR APPARATUS

William C. Cheney, Seattle, and Robert S. Wertheimer, Longview, Wash.

Application September 15, 1941, Serial No. 410,830

8 Claims. (Cl. 88—28)

The present invention relates to film projection apparatus, and more particularly to apparatus of the type used for the projection of still images from an endless film strip.

For the projection of still images for advertising purposes, particularly in public places such as in lobbies, stations or display windows, or for educational purposes, it is desirable to provide a machine which, when set into operation, will continue to operate automatically over long periods of time without requiring further attention. The pictures or other matter may be arranged upon an endless film which is threaded into the machine so that the continuity of operation is maintained by successive repetitions of projection of the film sequence. A machine of this general type, to be commercially practical, must be simple in its mechanical construction, having relatively few parts which may require adjustment, be capable of withstanding hard usage, and of low cost of construction.

It is a general object of the invention, therefore, to provide an automatic projector for strip films which is relatively simple in design, comprises a relatively few working parts, and is adapted for economical manufacture.

It is a further object of the invention to provide a new and improved projector for strip films, and, while it is not necessarily limited thereto, it is particularly adaptable for the projection of still images, the projector being entirely automatic in operation and capable of being left in continuous operation over long periods of time without requiring attention.

Another object of the invention is to provide a strip film projector apparatus having a new and improved intermittent film feeding arrangement whereby the film is held stationary in successive positions for a desired length of time and rapidly shifted at the ends of such periods to bring new frames into alignment with the film gate without causing excessive strains on the film.

In accordance with one embodiment of the invention, the projection apparatus comprises a standard having mounted thereon a light source, lenses and film gate, and means for holding an endless strip of film. A pair of film feed sprockets are provided, one ahead of the gate as regards the direction of film movement, being continuously driven by a suitable motor, the other, following the gate, being connected through a spring arrangement to a driving shaft for intermittent rotation, the driving shaft being connected for continuous rotation by the motor. The intermittent feed sprocket is held in a plurality of successive stationary positions by an arrangement of stops, which stops are adapted to be successively shifted momentarily to an inoperative position so as to permit rapid rotation of the sprocket by the spring through a predetermined angle corresponding to a single image frame.

For a consideration of what is believed to be novel and inventive, attention is directed to the following description and the accompanying drawings, while the features of novelty which characterize the invention will be pointed out with greater particularity in the appended claims.

In the drawings, Figure 1 is a side elevation of the projector with the motor driven fan removed for greater clarity; Figure 2 is a front elevation of the projector; Figure 3 is a view showing the side of the projector opposite to that shown in Figure 1; Figure 4 is a sectional view illustrating the details of the driving connection for the intermittent film feed sprocket; Figure 5 is an enlarged view in perspective of one of the spring stops; and Figure 6 is a view illustrating one form of screen arrangement or viewing hood which may be used with the projector.

Referring now to the drawings, the projector comprises a base 10 having a vertical standard 11 suitably secured thereon, and upon one side of which standard is suitably mounted a light source 12, a reflector 13, condensing lens 14, film gate 15, and an objective mount 16. An endless strip of film 17 is threaded through the gate 15 and trained over the idler spools 18, 19, 20, 21 and feed sprockets 22 and 23. A weighted idler spool 24 arranged upon the end of an arm 25, pivoted as at 26, bears against the film strip to take up slack therein. The film is held in the proper plane against the gate aperture by means of a suitably arranged leaf spring 27 secured as at 28 to the standard 11. Wire spring clips 31 and 32 suitably secured at one end to the standard 11 bear against the edges of the film strip to hold the film firmly upon the sprockets 22 and 23, respectively, with the teeth of the latter extending through the film perforations. The film is adapted to be moved by the feed sprockets in the counterclockwise direction, or upwardly through the film gate. The feed sprockets are driven by a suitable motor 35 through reduction gearing 36, the lower sprocket by the chain connection 37, and the upper sprocket by chain connection 38. The lower sprocket, being fast coupled to the motor, is adapted to be continuously driven thereby at a relatively slow rate, while the upper sprocket 23, being resiliently coupled to the motor, is driven intermittently to bring the various pictures of the film strip into registry with the gate aperture.

The driving arrangement for the intermittently operated feed sprockets 23 is more clearly illustrated in Figure 3 and in the enlarged sectional view of Figure 4. The feed sprocket 23 is secured to an overhanging end of a driven shaft 41 which is in turn suitably journaled in bearing 42 secured in a cooperating opening through the standard 11. Secured to the opposite end of the shaft 41 by a set screw 43 is a collar 44 having a projecting arm 45 adapted to engage with a plurality of leaf spring stops 46 arranged circumferentially around the shaft. A hollow driving shaft 47 is mounted in axial alignment with the shaft 41, the outer end of the shaft 47 being closed by a bearing piece 48 fixedly secured therein and which in turn is journaled in an arm 49 suitably secured by support 51 to the standard. The driving shaft 47 is provided with a chain sprocket 52 rigidly secured thereto, and is adapted to be continuously driven through the chain 38 by the motor 35. The other end of the driving shaft 47 is of a reduced outer diameter forming a shoulder 53, the reduced diameter portion of the shaft extending through a cooperating opening in the arm 54 extending downwardly from the support 51. The left end of the driving shaft 47 as viewed in Figure 4 is loosely arranged concentrically over the adjacent end of the collar 44 for free rotational movement thereupon. A collar 55 is secured to the end of the driving shaft 47 by means of a set screw 56, and is provided with an upwardly extending arm 57 somewhat longer than arm 45 for engaging successively with the various leaf spring stops 46 to remove them from the path of travel of the arm 45 secured to the driven shaft 41. A resilient connection is provided between the driving and driven shafts in the form of a torsion spring 58 arranged within the hollow driving shaft 47, one end of the spring being rigidly secured to the bearing block 48, the opposite end being secured rigidly into the end of the collar 44 on the shaft 41.

The stops 46, one of which is shown more clearly in the perspective view of Figure 5, are formed of leaf springs of a suitable material, and are provided with suitable apertures 61 at one end for fastening to supporting blocks 62 extending outwardly from the standard 11. The free end of each leaf spring is provided with an inwardly extending hook portion 63 of a width approximately one half the width of the leaf, while the other half of the end is straight. The leaf spring stops 46 are uniformly spaced in a circle coaxially with the driving and driven shafts, the free ends thereof all extending inwardly toward the shafts in the same direction and into the path of movement of the arms 45 and 57 secured to the driven and driving shafts, respectively. It will be observed that the arms 45 and 57 are spaced axially apart, the end of arm 45 being adapted to engage the hook portions 63 of the spring stops, while the end of arm 57 is adapted to engage only with the straight portions thereof.

In the operation of the projector, upon the energization of the motor 35, the driving shaft 47 is continuously rotated at a relatively slow speed. The rotation of the driving shaft 47 will not be restricted by the stop arrangement, since the arm 57 engages with each of the stop springs in succession, moving each one slowly outwardly, and then slips off the straight end portion to pass on and into similar engagement with the next succeeding stop spring. The driven shaft 41, however, will be retained in a stationary position by each stop 46 by virtue of the fact that the end of the arm 45 will be engaged by the hook portions 63 thereof. During restraint of the driven shaft 41, continued rotation of the driving shaft 47 tensions the spring 58, all of the energy of the motor, minus that lost through frictional resistance, being stored in the spring. Upon continued rotation of the driving shaft 47 the arm 57 will eventually engage with the stop restraining the driven shaft 41 and move that stop outwardly to an inoperative position due to the longer length of the arm 57, whereupon the arm 45 will be released. Due to the tension of the spring 58, the driven shaft, when released, will be rotated by energy stored in the spring with a rapid movement through an angle determined by the spacing between stops, it being understood that the motion of the driven shaft will be arrested upon engagement of the arm 45 with the next successive stop hook. The spacing between stops, and hence, the angular rotation of the film sprocket 23, will be so adjusted that a movement is imparted to the film corresponding to the distance from one picture frame to the next. In the projection of stills, the period of showing of each still may be varied by controlling the motor speed, or by varying the ratio of the speed reduction gearing. Such variations, however, will not affect the rapidity of the film shifting movements and the transition from one image to the next will always be sufficiently rapid so as not to produce eye strain.

The film feed sprocket 22 is driven continuously by the chain connection with the motor 35 at the same rate as the sprocket 52 on the driving shaft 47. Following a movement of the film strip, and before the next succeeding lineal movement thereof, the continued rotation of the film feed sprocket 22 will loop the film strip as indicated at 65. The extent of the slack thus formed in the interval between successive operations of the intermittent feed sprocket 23 will be equal to the length of one picture frame. The formation of this slack loop, however, will not disturb the fixed position of the picture frame in registration with the gate aperture by virtue of the pressure of the spring member 27. Upon operation of the intermittent feed sprocket 23, movement of a successive picture into registry with the gate aperture will take up the slack formed by the sprocket 22 and consequently the entire strip of film will not be subjected to a sudden jerk. It will readily be understood that, due to the inertia of the film strip and the inherent frictional resistance of the various rollers, the film would be subjected to excessive wear at the perforations, resulting in a relatively short film life, if the entire length of film were subjected to a sudden jerk at each operation of the intermittent feed sprocket. With the arrangement as described, however, the film is not subject to such rough treatment and the film life is materially increased whereby long continued operation of the projector is entirely possible.

For precluding excessive heating of the apparatus and possible injury to the film, a cooling system is provided comprising a transparent heat insulator 66 suitably arranged between the condenser lens and the film gate, and a motor driven fan 67 suitably supported as by mounting brackets 68 upon the standard 11. The standard is provided with an opening 69 back of the lamp and condenser lens so as to permit free circulation of air.

The projector may be enclosed within a suitable housing and arranged in any convenient location for projecting images upon a suitably arranged screen. One arrangement consists of an enclosure 70, illustrated in Figure 6, within one end of which may be mounted the projector, suitable louvre openings 71 being provided therein for the circulation of air, and the other end being provided with a translucent screen 72 against the rear surface of which the images are projected by the enclosed projector.

It will readily be appreciated that the component elements of the projector described are all of a relatively simple design and of such a nature that they may readily be assembled to produce a unit of low manufacturing cost. Moreover, none of the parts is susceptible to getting out of adjustment so as to necessitate frequent inspection or servicing operations. Accordingly, the projector apparatus may be set up in any desired location and be left to operate automatically over relatively long periods of time.

Having described my invention in one operative embodiment, I desire to have it understood that the specific arrangement of details is entirely illustrative, and that the invention, of course, may be carried out by other means. It is intended, therefore, in the appended claims to cover all such modifications as may readily occur to one skilled in the art without departing from the true spirit and scope of the invention.

We claim:

1. An intermittent film feed arrangement, comprising a film feed sprocket, a driven shaft operatively associated with said sprocket for rotating the same, a driving shaft, a torsion spring connection between said driving and driven shafts, a plurality of stops circumferentially arranged around said driven shaft, a projection mounted on said driven shaft adapted for engaging successively said stops, a projection mounted on said driving shaft for successively engaging the stops engaged by the projection on said driven shaft for removing said stops from the path of the projection on the driven shaft and releasing said driven shaft for rotation through an angle corresponding to the spacing between adjacent stops.

2. An intermittent film feeding arrangement comprising a film feed sprocket, a driven shaft rotatably supporting said sprocket, a driving shaft, a torsion spring connection between said driven and driving shafts, a plurality of equally spaced stops arranged circumferentially around said driven shaft, a projection mounted on said driven shaft adapted for engaging successively with each of said stops, a projection mounted on said driving shaft adapted for operatively engaging each of said stops in succession and moving each said stop in turn out of the path of the projection on the driven shaft, means for driving said driving shaft, said spring being tensioned whereby upon removal of the stop engaged by the projection on said driven shaft from the path thereof said driven shaft is rotated rapidly through an angle corresponding to the spacing between adjacent of said stops.

3. An intermittent film feeding arrangement comprising a film feed sprocket, a driven shaft rotatably supporting said sprocket, a driving shaft extending coaxially with said driven shaft, a spring connection between said driving and driven shafts, a plurality of stops arranged equally spaced in a circle coaxially around said shafts, a projection mounted on said driven shaft adapted to engage successively with each of said stops, means mounted on said driving shaft arranged for successive engagement with each of said stops for removing said stops from the path of the projection on said driven shaft, said spring being tensioned whereby upon removal of the successive stops said driven shaft will be released for rapid rotation in a step by step manner through angles corresponding to the spacing between adjacent stops.

4. In a projection apparatus, a base, a standard on said base, a film gate on said standard, a plurality of idler spools mounted on said standard, an endless film arranged through said gate and around said spools, a first, continuously driven feed sprocket engaging said film ahead of said gate as regards the direction of film motion, a second, intermittently driven feed sprocket engaging said film after said gate, a driving shaft for said second sprocket, a motor for driving said shaft, stop means fixedly secured on said standard for said second sprocket, means associated with said driving shaft for periodically releasing said second sprocket from said stop means, and means including a spring connection between said shaft and said second sprocket for effecting a rapid rotation of said second sprocket through a predetermined angle upon release of said stop means.

5. In a projection apparatus, a first, continuously driven feed sprocket, a second, intermittently driven feed sprocket, a film gate between said sprockets, an endless strip of film arranged over said sprockets and through said gate, a motor connected for continuously rotating said first sprocket, a driving shaft for said second sprocket connected for continuous rotation by said motor, a spring connection between said driving shaft and said second sprocket, stationarily mounted resilient stop means for holding said second sprocket stationary, and means associated with said driving shaft for moving said stop means to an inoperative position at predetermined intervals of time to permit rotation of said second sprocket by said spring with a rapid movement through a predetermined angle.

6. In a projection apparatus, a first, continuously driven feed sprocket, a second, intermittently driven feed sprocket, a film gate between said sprockets, an endless film arranged over said sprockets and through said gate, a motor for continuously driving said first sprocket, a driving shaft for said second sprocket connected for continuous rotation by said motor, a resilient means connecting said driving shaft and said second sprocket, stationarily mounted resilient stop means operatively associated with said second sprocket for retaining said second sprocket in a plurality of successive stationary positions, means associated with said driving shaft for shifting said stop means to an inoperative position at periodic spaced intervals of time to permit movement of said second sprocket by said resilient connecting means through a predetermined angle of rotation.

7. In a projection apparatus, an intermittent film feed arrangement comprising a film feed sprocket, a driven shaft for said sprocket, a hollow driving shaft arranged coaxially with said driven shaft, means for continuously rotating said driving shaft, a spring means arranged within said driving shaft resiliently connecting said shafts, a plurality of stationarily mounted resilient stops arranged around said shafts, means on said driven shaft for successively engaging said stops, and means on said driving shaft for successively removing the stops from the path of said means on said driven shaft to permit predetermined angular rotation of said sprocket by said spring means.

8. In a projection apparatus, an intermittent film feed arrangement comprising a film feed sprocket, a driven shaft for said sprocket, a driving shaft arranged coaxially with said driven shaft, means for continuously rotating said driving shaft, a loose connection between said shafts including energy storing means, resilient stop means stationarily arranged around said driven shaft for retaining said driven shaft in a plurality of successive positions, and means on said driving shaft for effecting release of said driven shaft from said stop means to permit rotation thereof by energy from said energy storing means through predetermined angular increments.

WILLIAM C. CHENEY.
ROBERT S. WERTHEIMER.